(12) United States Patent
Kazerani et al.

(10) Patent No.: US 9,756,098 B2
(45) Date of Patent: Sep. 5, 2017

(54) MULTI-TENANT OVER-THE-TOP MULTICAST

(71) Applicant: Verizon Digital Media Services Inc., Dulles, VA (US)

(72) Inventors: Alexander A. Kazerani, Santa Monica, CA (US); Jayson G. Sakata, Encino, CA (US); Robert J. Peters, Santa Monica, CA (US); Amir Khakpour, Santa Monica, CA (US); Derek Shiell, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 78 days.

(21) Appl. No.: 14/486,093

(22) Filed: Sep. 15, 2014

(65) Prior Publication Data

US 2016/0080445 A1    Mar. 17, 2016

(51) Int. Cl.
 *G06F 15/16* (2006.01)
 *H04L 29/06* (2006.01)
(52) U.S. Cl.
 CPC .......... *H04L 65/4076* (2013.01); *H04L 65/80* (2013.01)
(58) Field of Classification Search
 None
 See application file for complete search history.

(56) References Cited

U.S. PATENT DOCUMENTS

| | | | | |
|---|---|---|---|---|
| 2007/0008969 A1* | 1/2007 | Elstermann | ....... | H04L 29/06027 370/390 |
| 2007/0101012 A1* | 5/2007 | Li | ..... | H04L 29/06027 709/231 |
| 2008/0102749 A1* | 5/2008 | Becker | ..... | H04L 12/1877 455/3.06 |
| 2008/0184087 A1* | 7/2008 | Hayashi | ..... | H04L 1/1825 714/751 |
| 2009/0049469 A1* | 2/2009 | Small | ..... | H04H 20/82 725/35 |
| 2010/0020690 A1* | 1/2010 | Komiya | ..... | H04L 12/1881 370/235 |
| 2010/0260180 A1* | 10/2010 | Wu | ..... | H04L 1/1819 370/390 |
| 2011/0082946 A1* | 4/2011 | Gopalakrishnan | .. | H04L 65/4084 709/231 |

\* cited by examiner

*Primary Examiner* — Scott B Christensen
*Assistant Examiner* — Thomas Richardson
(74) *Attorney, Agent, or Firm* — Los Angeles Patent Group; Arman Katiraei

(57) ABSTRACT

Some embodiments provide a multi-tenant over-the-top multicast solution that integrates the per user stream customizability of unicast with the large scale streaming efficiencies of multicast. The solution involves an application, different multicast groups streaming an event with different customizations, and a manifest file or metadata identifying the different groups and customizations. The solution leverages the different multicast groups in order to provide different time shifts in the event stream, different quality level encodings of the event stream, and different secondary content to be included with a primary content stream. The application configured with the manifest file or metadata dynamically switches between the groups in order to customize the experience for a user or user device on which the application executes. Switching from multicast to unicast is also supported to supplement available customizations and for failover.

20 Claims, 11 Drawing Sheets

MULTI-TENANT OVER-THE-TOP MULTICAST

BACKGROUND INFORMATION

Contrary to television broadcasts which are waning or stagnating in viewership, the viewership of content over Internet Protocol (IP) networks is continually increasing. This is due to many factors including the increasing availability of major content provider and television network content on the IP networks and the breadth of user content that individuals upload and share via video-sharing sites. IP networks also allow for on-demand content viewing and often provide digital video recorder (DVR) like functionality (e.g., rewinding, pausing, fast-forwarding, etc.). Moreover, content delivered through IP networks can be customized on a per user basis while allowing the user to view the content wherever and whenever the user wants using any device with wired or wireless network connectivity.

The increased viewership is placing greater demand on IP network resources. One of the primary reasons for the increased demand is the reliance of content distributors on unicast based transmission. As is well known, unicast is a one-to-one transmission methodology, whereby one copy of content is passed between one source and only one destination. Even if the same content is requested from the same source by a different destination, a new copy of the content will be passed from the source to the different destination over a unique connection or session established between the source and destination. Consequently, unicast produces a linear increase in the demand that is placed on IP networks for each additional stream or item of content that is delivered to a user.

Multicast provides a one-to-many transmission of content. A source is the origin for a multicast group and streams the packets encapsulating content to one or more hosts and routers that have joined the multicast group. These hosts and routers then fan-out the packets to other hosts and routers that join the multicast group until the packets arrive at users that have also joined the multicast group. Specifically, the users receive the packets from a host or router in the multicast group that is closest to them rather than from the origin directly. Multicast is an efficient transmission methodology because it requires little to no overhead once the multicast group is configured. Hosts and routers that have joined the multicast group perform little or no processing on the multicast group packets and simply forward those packets to other group members that join the group through the host or router.

While efficient in streaming the same content to many users, many content distributors pass over multicast in favor unicast, because multicast, in its standard form, is unable to offer the same viewing and functional advantages that a one-to-one connection between a user and a content source affords. A first shortcoming is that the one-to-many transmission methodology of multicast prevents a content source from offering users the ability to start the stream whenever they want. It further restricts the content source from offering DVR-like functionality such that users could rewind, fast-forward, or pause the transmission of the stream as they please. Another shortcoming is that the one-to-many transmission methodology of multicast prevents a content source from optimizing and customizing the stream on a per user basis. Through unicast, the content distributor can offer the stream in multiple bit rates and adjust the stream per user depending on the network connectivity to the user and capabilities of the user device. Also through unicast, the content distributor can change advertising accompanying the stream on a per user basis so that the content can itself be customized on a per user basis. Multicast requires that the same content with the same advertisements be presented to all users in the multicast group.

However, as noted above, the increased demand being placed on IP networks and the increased popularity of content viewership over IP networks are forcing a transition away from strictly streaming content using unicast, especially in the case of largely viewed live events. Accordingly, there is a need to preserve many of the added functionality afforded by unicast, while preserving the large scale streaming efficiencies afforded by multicast.

BRIEF DESCRIPTION OF THE DRAWINGS

A preferred embodiment for a multi-tenant over-the-top multicast solution will now be described, by way of example only, with reference to the accompanying drawings in which.

DETAILED DESCRIPTION OF PREFERRED EMBODIMENTS

Figure 1:
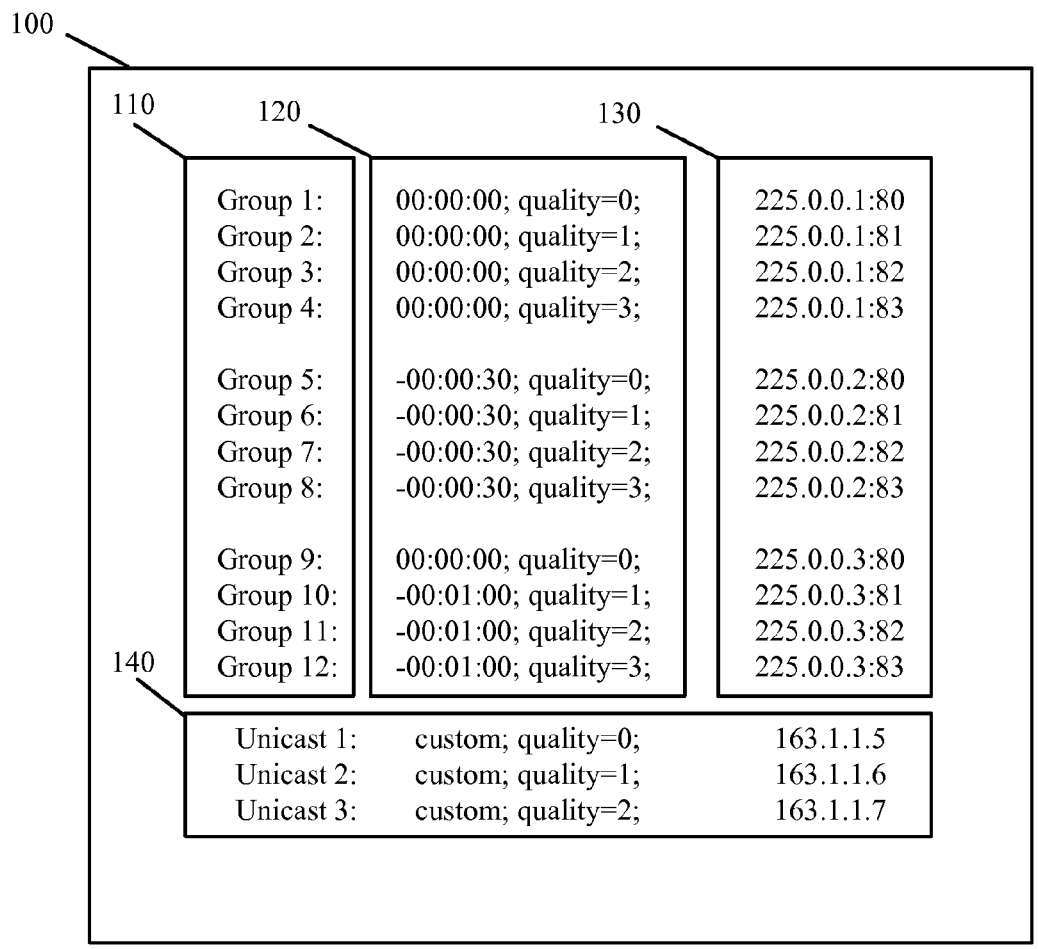
FIG. 1 conceptually illustrates a manifest file in accordance with some embodiments.

To aid in the discussion that is to follow, content is defined to include any of audio, video, multimedia, games, applications, remote services, images, and text (and combinations thereof). Streaming content or a content stream involves the transmission of content over a digital medium or network. The transmission involves passing packets that encapsulate different digitally encoded segments of the content. Packets encapsulating streaming content may be transmitted over a packet-switched network, such as an Internet Protocol (IP) network using the User Datagram Protocol (UDP), Realtime Transport Protocol (RTP), or other networking protocol, wherein the IP network can route the packets based on either IPv4 or IPv6 addressing. Unicast and multicast configuration and operation are well known and the description of each is omitted herein for purposes of simplicity.

I. Overview

Some embodiments provide a multi-tenant over-the-top multicast solution. The solution integrates the per user stream customizability of unicast with the large scale streaming efficiencies of multicast. In some embodiments, the multi-tenant over-the-top multicast solution provides an intelligent client application and configures different multicast groups that the intelligent client application can dynamically switch between in order to realize the per user stream customizability of unicast while receiving multicast streamed content.

The intelligent client application is intended as a cross-platform, cross-vendor, cross-content provider, cross-user device, and cross-network application that can be reused for receiving streaming content from different content sources, networks, sites, etc. The intelligent client application can be obtained from any content source or third party site and is configured to execute on any user device having at least one processor. Components of a user device that can execute the intelligent client application are described with reference to FIG. 11 below.

The different multicast groups serve different variants of content or content customizations using different multicast addresses. Each variant or customization is a separate content stream that is accessed by a user device with a different multicast address. The different multicast addresses for the multicast groups providing the different content stream variants or customizations for a given event can be specified or identified using the same address but different port numbers. Alternatively, the different multicast addresses for the multicast groups of a given event can be specified or identified with unique addresses. In implementations that use IP—such as IP version 4 (IPv4) or version 6 (IPv6)—the IP addressing may be restricted to class D IPv4 addresses and IPv6 addresses with the ff00::/8 prefix for compliance with standard multicast addresses. However, any IP address in the IPv4 and IPv6 spectrum can be used with the proper network configurations. To illustrate a solution advocated by the embodiments described herein, a first variant of content may be streamed using a first multicast group that is identified with the class D multicast address 225.0.0.1, a second variant of content may be streamed using a second multicast group that is identified with the class D multicast address 225.0.0.2, and the intelligent client application switches between these different multicast groups in order to optimize and customize the presentation of the content for a particular user or user device running that instance of the intelligent client application.

The multi-tenant over-the-top multicast solution of some embodiments leverages multicast to provide DVR-like functionality. Specifically, the solution streams content using multicast in a manner that allows for customizability in the playback of the content via rewinding, pausing, and forwarding functionality as some examples. To do so, some embodiments configure several multicast groups to stream a given event with each multicast group providing the event content with a different time shift. The intelligent client application provides digital video recorder (DVR) like functionality on a user device by switching between the different time shifted multicast groups in response to user input to rewind, pause, or forward through the event. In some embodiments, the intelligent client application limits the time shifting increments offered to the user to match those available from the different multicast groups. In some other embodiments, the intelligent client application allows the user to specify any arbitrary time shift with the application switching to the multicast group that provides the closest time shift to the one specified by the user.

In addition to or in the absence of the different multicast groups, the intelligent client application of some embodiments is configured to dynamically switch between multicast and unicast in order to supplement or alternatively realize the per user multicast stream customizability of some embodiments. In some embodiments, the multi-tenant over-the-top multicast solution offers a hybrid implementation that leverages multicast and unicast to provide the DVR-like functionality. A source streams a live feed or primary feed of an event via multicast. An instance of the intelligent client application running on a user device joins the multicast group to provide the user with the live or primary feed. Since most users watch the live feed, network load will be greatly reduced relative to providing the live feed via unicast to each user. However, should a user rewind, forward, or pause the event, the intelligent client application switches from multicast to unicast. In so doing, the intelligent client application establishes a connection directly with the source in order to request and receive the event with the user specified time shift. If that same user again time shifts to return to the live or primary feed, the intelligent client application switches from unicast back to the multicast group providing the live or primary feed.

In some embodiments of the hybrid solution, a set amount of time shifting is supported through different multicast groups that are configured for an event. Should the user exceed the set amount of time shifting available through the different multicast groups, the intelligent client application then switches from multicast to unicast in order to present the content with the desired amount of time shifting extending beyond the set amount of time shifting provided though the different multicast groups. As most users are expected to remain within the set amount of time shifting, the majority of the content streaming will still be conducted using multicast, thereby reducing the load on the network and on the event source significantly.

The multi-tenant over-the-top multicast solution of some embodiments leverages multicast to dynamically customize the quality of multicast streamed content on a per user or per user device basis. Specifically, the solution streams event content over different multicast groups in a manner that allows each user device receiving the content to dynamically increase or decrease the quality of the content based on capabilities of that user device and network connectivity to that user device. In some such embodiments, content for an event is transcoded at different quality levels with each quality level encoding of the content being streamed over one of the multicast groups that are configured for the event. The different quality levels can represent any of different bitrate encodings, different amounts of compression, and different resolutions for the content as some examples. The intelligent client application dynamically adjusts the quality of the stream on the user device to match the user device's resources and network connectivity by switching between the different quality level multicast groups.

The multi-tenant over-the-top multicast solution also provides a hybrid solution that leverages multicast and unicast to customize the quality of content streamed on a per user or per user device basis. In some such embodiments, content is streamed at different quality levels through different multicast groups. Should the optimal quality level encoding of the event for a particular user device be outside the available set of quality level encodings offered through the multicast groups, the intelligent client application switches from multicast to unicast to request and receive the optimal quality level encoding for that particular user device directly from a content source.

In some embodiments, the multi-tenant over-the-top multicast solution uses different multicast groups to provide different secondary content for an event streaming primary content. The secondary content can include third party content that is added during breaks in the primary content stream, overlaid onto the primary content stream, or otherwise presented with the primary content stream. The secondary content can include advertisements, informational content (e.g., a stock or sports score ticker), interactive applications, or any other content that is not encoded as part of the primary content stream. The intelligent client application of some embodiments dynamically switches between the different multicast groups in order to provide secondary content that is relevant to the user viewing the content using the intelligent client application. For instance, the intelligent client application presents the primary content stream by joining a first multicast group and during a break in the primary content stream, the application switches to one of a second set of multicast groups providing an advertisement that is relevant to the user or user device.

In some embodiments, the multi-tenant over-the-top multicast solution provides such secondary content customization by configuring the intelligent client application to join a multicast group for presentation of the primary content stream and to switch to a unicast address to retrieve a relevant advertisement from a third party before rejoining the multicast group to resume the primary content stream. In this manner, the majority of the content is streamed using multicast with intermittent periods of unicast usage.

In some embodiments, different multicast groups are used to provide a combination of the above described customizations. For example, a first multicast group is configured to provide a live stream of particular content at a first quality encoding, a second multicast group is configured to provide the live stream at a different second quality encoding, and a third multicast group is configured to provide the particular content with a one minute delay at a different third quality encoding.

The multi-tenant over-the-top multicast solution can also provide a hybrid implementation that leverages multicast and unicast for failover purposes. Specifically, a particular network may not join the multicast groups streaming the event content provided by a content source. Accordingly, users of that particular network may be unable to receive the stream using the multicast and, in these circumstances, the intelligent client application fails over to unicast such that all users can receive the event content. The benefit of this hybrid solution is that all users will be able to receive the event content with a majority of those users receiving the event content via multicast, thereby reducing the burden on the content source.

In some embodiments, any of a manifest file and metadata may be used to configure the intelligent client application to provide any one or more of the above described functionality over multicast. FIG. 1 conceptually illustrates a manifest file 100 in accordance with some embodiments. The manifest file 100 identifies for any instance of the intelligent client application, the different multicast groups 110 that are configured for a given event and that provide different variants of the event content. Column 120 of the manifest file 100 identifies the different time shifts, quality, or secondary content associated with each of the multicast groups 110. Column 130 of the manifest file 100 identifies the addressing for switching between the multicast groups 110 configured for the event.

As shown, the manifest file also identifies one or more unicast addresses 140 that supplement the customizations offered by the multicast groups 110. The unicast addresses 140 can identify a content source or other servers that host the event content. In other words, the unicast addresses 140 can point to IP addressing of the content source or a content delivery network (CDN) that hosts and distributes the content source content on behalf of the content source. In this figure, different unicast addressing is configured to allow the intelligent client application to receive the event content with a custom time shift with each unicast address providing the event content at a different quality level encoding.

In some embodiments, the configuration information of the manifest file identifies one multicast address for a multicast group providing a primary stream for particular content and a unicast address with which the intelligent client application can receive the particular content directly from the content source with a custom time shift, a non-default quality encoding, or custom secondary content. In such cases, the intelligent client application joins the multicast group to initially receive the primary stream, then the application switches from multicast to unicast to provide a custom time-shift, non-default quality encoding, or secondary content.

Figure 2:
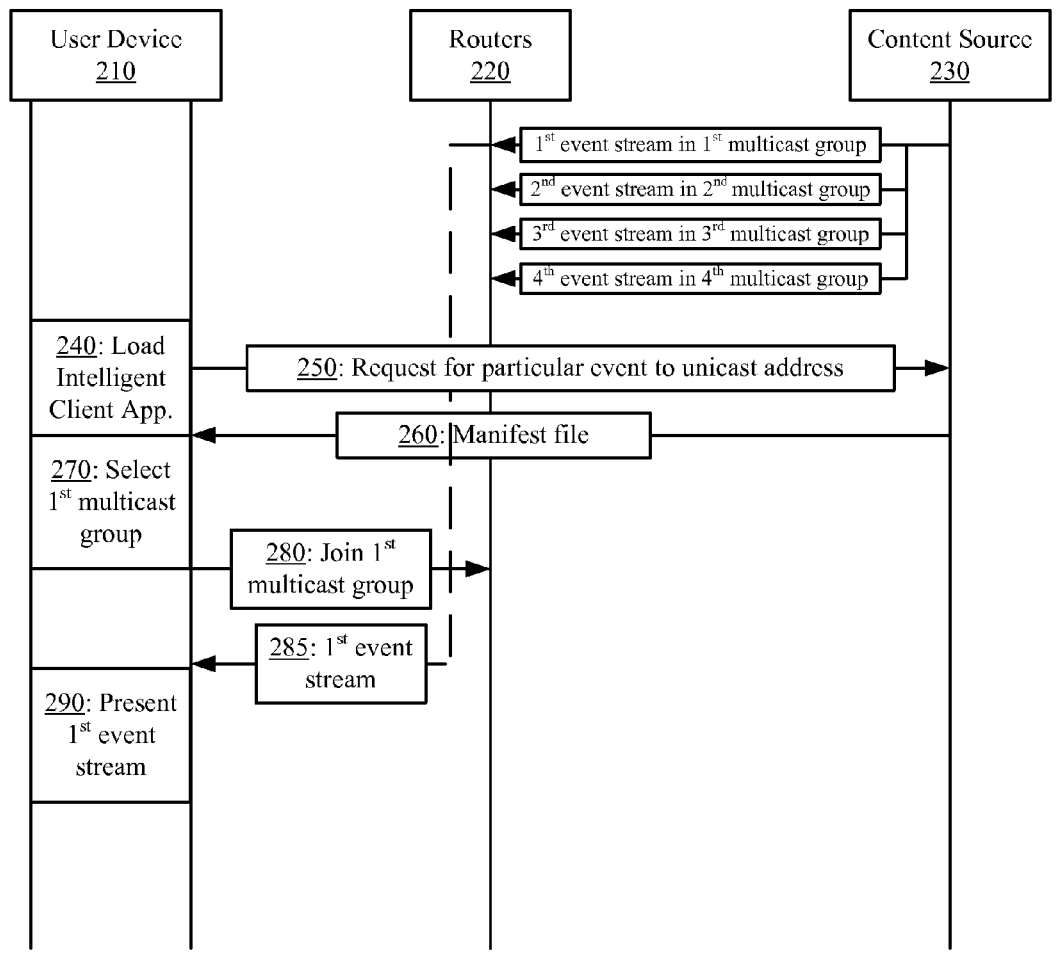
FIG. 2 illustrates initializing the intelligent client application with a manifest file in accordance with some embodiments.

FIG. 2 illustrates initializing the intelligent client application with a manifest file in accordance with some embodiments. The figure depicts a user device 210, routers 220, and a content source 230. The content source 230 can be one or more machines tasked with streaming particular content with any of the above described customizations or optimizations through different multicast groups, and the routers 220 are devices within the network that have joined the different multicast groups and support the multicast distribution of the particular content with the different customizations or optimizations. As shown, the content source 230 begins streaming different customizations of a particular event across four multicast groups that the routers 220 have joined.

At some stage, the intelligent client application loads (at 240) on the user device. The intelligent client application loading can be in response to user input to begin streaming the particular event. The user input can include any of invocation of a link, entering an address, or otherwise loading a website or configuration to request the particular event stream. If the application is present on the user device, it is executed. Otherwise, the application is downloaded from the content source or other third party site and is executed on the user device thereafter. Once loaded, the intelligent client application sends (at 250) a request for the particular event stream to a unicast address associated with the content source 230. The unicast address may be identified from the user input. In some embodiments, the user may invoke a link or specify an address using a web browser or other application that sends the request for the particular event stream to the content source 230 and the response from the content source 230 causes the intelligent client application to load on the user device 210.

In any case, the content source 230 sends (at 260) a manifest file in response to the request. The manifest file is received by the user device 210. The manifest file contains the configuration information for the particular event. In this figure, the configuration information identifies the different multicast groups that have been configured for the particular event, the customizations or optimizations provided by each multicast group, and the addressing for accessing each multicast group. The manifest file optionally specifies one or more unicast addresses that can be used to supplement the multicast groups and provide additional customizations and optimizations for the particular event stream.

Based on the manifest file configuration information, the intelligent client application selects (at 270) a first multicast group from which to receive the particular event stream. The intelligent client application may be configured to initially select the multicast group that presents a primary stream of the particular event at a default quality encoding, wherein the primary stream can be a live stream.

The intelligent client application then causes the user device 210 to join (at 280) the first multicast group. Upon joining the first multicast group, the primary stream for the particular event is streamed (at 285) to the user device 210 from the routers 220. The user device 210 then processes and presents (at 290) the primary stream. If any customizing functionality is invoked on the intelligent client application, the application references the manifest file to identify which multicast group or unicast address to switch to in order to provide the particular content with the requested customization.

The configuration information from the manifest file can also or alternatively be passed as metadata that is periodically included in the header or body of the packets used to stream the event content. In some embodiments, the metadata containing the configuration information can be included in control packets that are periodically intermixed with the packets used to stream the event content. The metadata can be replicated or provided in any of the multicast groups configured for an event as well as in any direct unicast stream established between a user and a content source. In some cases, the metadata is used to update information originally obtained from the manifest file.

Figure 3:
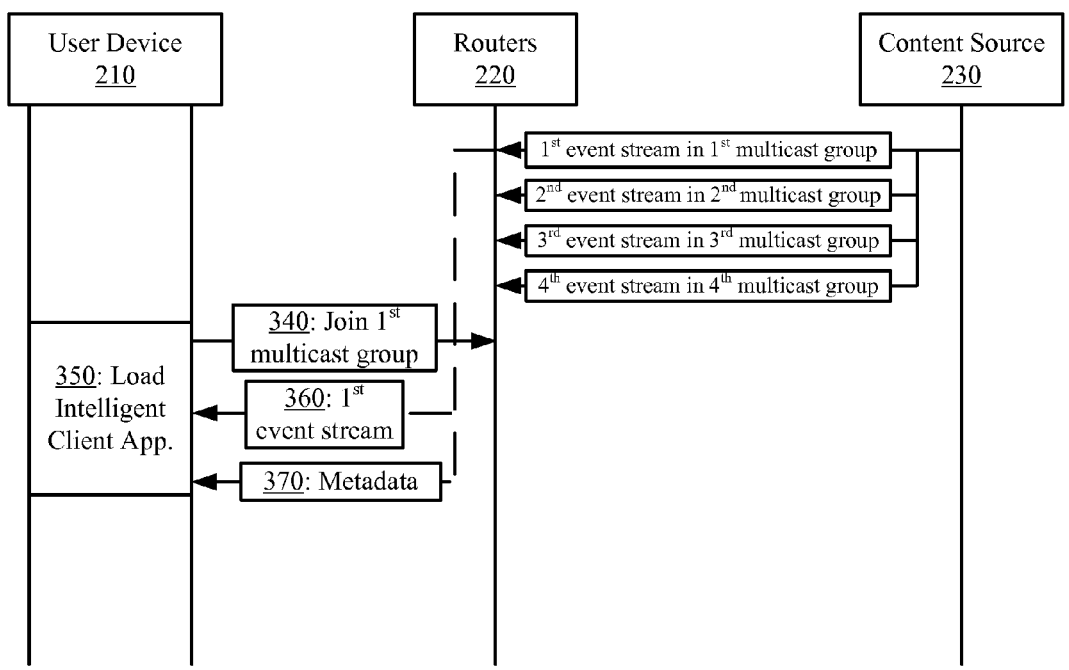
FIG. 3 illustrates initializing the intelligent client application with metadata in accordance with some embodiments.

FIG. 3 illustrates initializing the intelligent client application with metadata in accordance with some embodiments. In this figure, the initialization of the intelligent client application begins with the user device 310 joining (at 340) a first multicast group. This can be in response to invocation of a link, entry of an address, or otherwise loading a website or configuration. As part of joining the first multicast group or in response to joining the first multicast group, the intelligent client application loads (at 350) on the user device.

The intelligent client application then begins to receive (at 360) packets for the stream provided over the joined multicast group. Intermixed with the packets is the metadata specifying additional multicast groups and optionally, one or more unicast addresses, at which different customizations of the stream are available. Accordingly, the intelligent client application receives (at 370) the metadata and processes the metadata to identify the different customizations that are available through the different multicast groups. Thereafter, should any customization functionality be invoked, the intelligent client application can provide the customization by switching to the appropriate multicast group or unicast address.

II. Customized Time Shifting with Multicast

Figure 4:
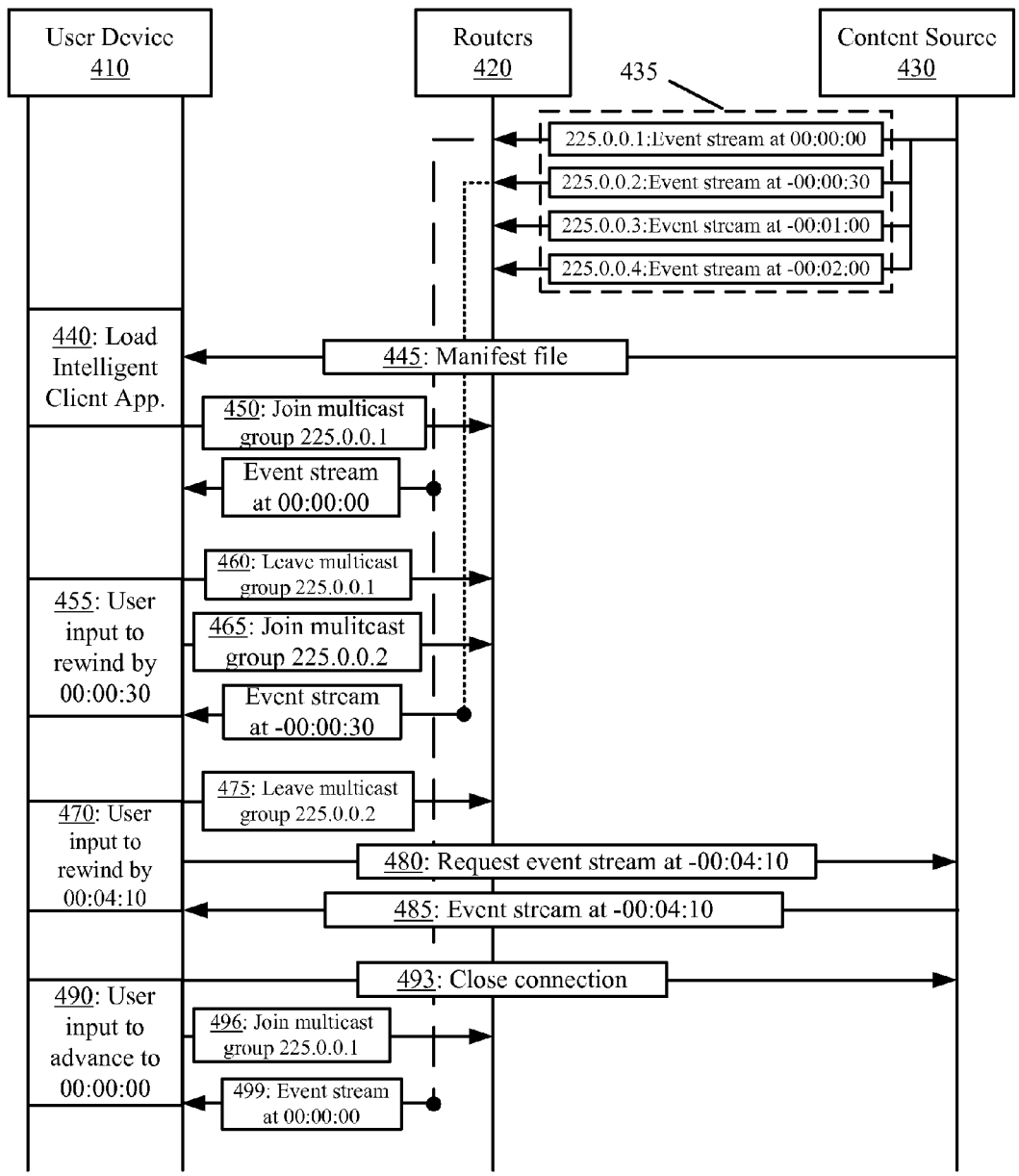
FIG. 4 illustrates providing DVR like functionality to a user device using different multicast groups in accordance with some embodiments.

FIG. 4 illustrates providing DVR like functionality to a user device using different multicast groups in accordance with some embodiments. The figure illustrates a user device 410, routers 420, and a content source 430.

The content source 430 configures and simultaneously streams different time shifted streams for a given event across different multicast groups 435 that are configured for that event. Specifically, the content source 430 provides a live stream of the event using a first multicast group identified by a first multicast address, provides a thirty second delay of the event using a second multicast group identified by a second multicast address, provides a one minute delay of the event using a third multicast group identified by a third multicast address, and provide a two minute delay of the event using a fourth multicast group. Any number of multicast groups with any time shift can be provided, however the discussion of FIG. 1 will be restricted to the four identified groups for purposes of simplicity. Even though the multicast groups 435 are identified by unique IP addresses in this figure, some embodiments can provide the same IP address to each group and uniquely identify the groups using a different port number.

The routers 420 join each of the multicast groups 435. In some embodiments, advertisement or control messaging is passed by the content source 430 to notify the routers 420 of the groups to join. In some embodiments, the multicast addresses used for streaming the event are reserved in advance of the event such that the when the stream begins, the routers 420 have already joined the groups. The routers 420 operate to fan-out the streams as per standard multicast operation.

In order to leverage the time shift over multicast functionality, the user device 210 loads the intelligent client application (at 440) of some embodiments. In this figure, the intelligent client application receives (at 445) a manifest file from the content source 430 identifying addressing for the different multicast groups 435 of the event and the time shift provided by each multicast group. The intelligent client application initializes presentation of the event on the user device by joining (at 450) the first multicast group. The manifest file can identify the first multicast group as a default group that the application is to first join. Alternatively, a link that is used to access the event can direct the application to the first multicast group. This can be the case when the event is a live streaming event. The application then processes and presents the content streamed over the first multicast group.

At 455, the user invokes a rewind or replay operation on the intelligent client application to go back up to thirty seconds in the stream. The application can provide either fixed increment time shifting operations that match the time shifting that is available from the different multicast groups or provide for custom incremental time shifting with the application adjusting the custom time shift to match time shifting provided by one of the available time shifted multicast groups. For example, if the user requests a twenty five second rewind from the live stream, the application would switch from the first multicast group to the second multicast group providing a thirty second delay. Similarly, if the user requests a thirty one second rewind from the live stream, the application could switch from the first multicast group to either the third multicast group providing a one minute delay or the second multicast group providing a thirty second delay.

In response to the rewind or replay operation invoked at 455, the application switches from the first multicast group to the second multicast group to go back thirty seconds in the content stream. The switch occurs by leaving (at 460) the first multicast group and joining (at 465) the second multicast group. The application then resumes playback of the event based on the thirty second delayed stream of the second multicast group. The switch from the first multicast group to the second multicast group occurs seamlessly with little to no buffering or blackout experienced on the user device 410.

At 470, the user invokes a custom time shift rewind or replay operation to time shift the playback position four minutes and ten seconds back from the live stream. Since this time shift is beyond the time shifting provided by any of the available multicast groups, the intelligent client application leaves (at 475) any joined multicast groups, establishes a direct connection with the content source 430 using unicast, and requests (at 480) the content at the specified position from the content source 430 over the established connection. The application then resumes (at 485) playback of the event over unicast at the designated time.

At 490, the user invokes an operation on the intelligent client application to advance the content back to the live stream. In response, the intelligent client application closes (at 493) the unicast connection and joins (at 496) the first multicast group, thereby once again receiving (at 499) the live stream over multicast.

Whereas each new unicast connection to the content source imposes additional overhead on the content source, the different multicast groups can support any number of user devices without any additional overhead on the content source. Accordingly, the intelligent client application along with the various multiple multicast groups allow the content source to provide the identified DVR like functionality while still being able to support a large viewing audience with no additional impact for any users receiving the content through one of the available multicast groups. Providing such functionality while streaming a large scale event would require exponentially more resources if the streaming was done using unicast exclusively.

Figure 5:
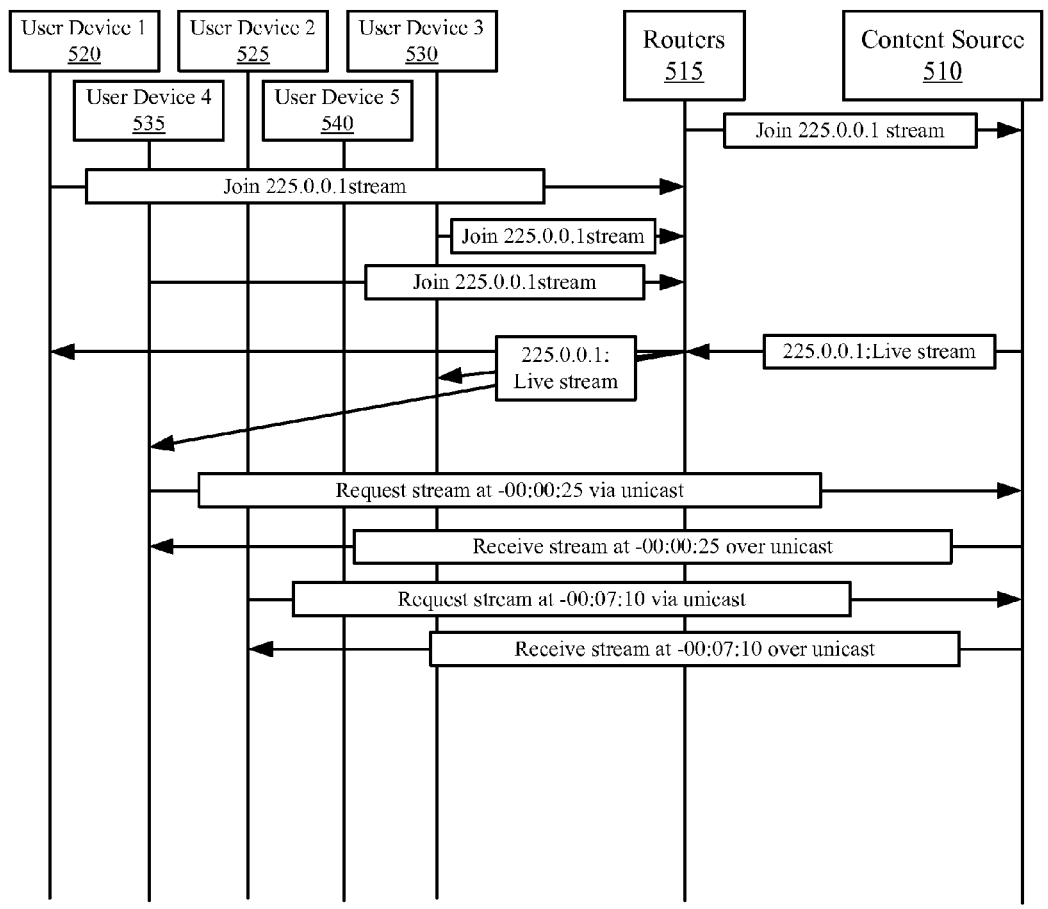
FIG. 5 presents a hybrid solution leveraging multicast and unicast to facilitate streaming of an event with DVR like functionality.

FIG. 5 presents a hybrid solution leveraging multicast and unicast to facilitate streaming of an event with DVR like functionality. In this hybrid solution, multicast is used to stream default content to a majority of users, while unicast is used to stream the content with a requested time shift customization. This greatly reduces the load on the content source and intermediary networks while still allowing the event to be streamed to a large audience with DVR like functionality.

This figure depicts a content source 510, routers 515, and several different user devices 520, 525, 530, 535, and 540. The content source 510 distributes a live stream of an event over a particular multicast group. The routers 515 join the particular multicast group to fan-out the event.

A manifest file or metadata is passed (not shown) to each of the user devices 520-540. This provides the intelligent client application running on each user device with the configuration information identifying the availability of the event and the different offered customizations.

All user devices, including user devices 520, 530, and 535, that watch the live stream also join the particular multicast group. In so doing, user devices 520, 530, and 535 receive the content from a participating router 520 over multicast. However, those user devices, including user devices 525 and 540, that have time shifted away from the live stream establish a unicast connection with the content source 510 in order to receive the event with the proper time shift.

III. Dynamic Content Optimization with Multicast

Some embodiments of the multi-tenant over-the-top multicast solution leverage the different multicast groups to support optimizing content quality level on per user basis while streaming the content over multicast. In some such embodiments, the content source transmits the same content at different quality encodings over different multicast groups. As before, each multicast group is identified and accessed using a different multicast address. The intelligent client application optimizes the viewing experience on the user device by switching between the different multicast groups in to select a quality encoding of the content that is optimal for the user device. The selection is based on the user device's capabilities, user device's resource usage, and network connectivity in some embodiments.

Figure 6:
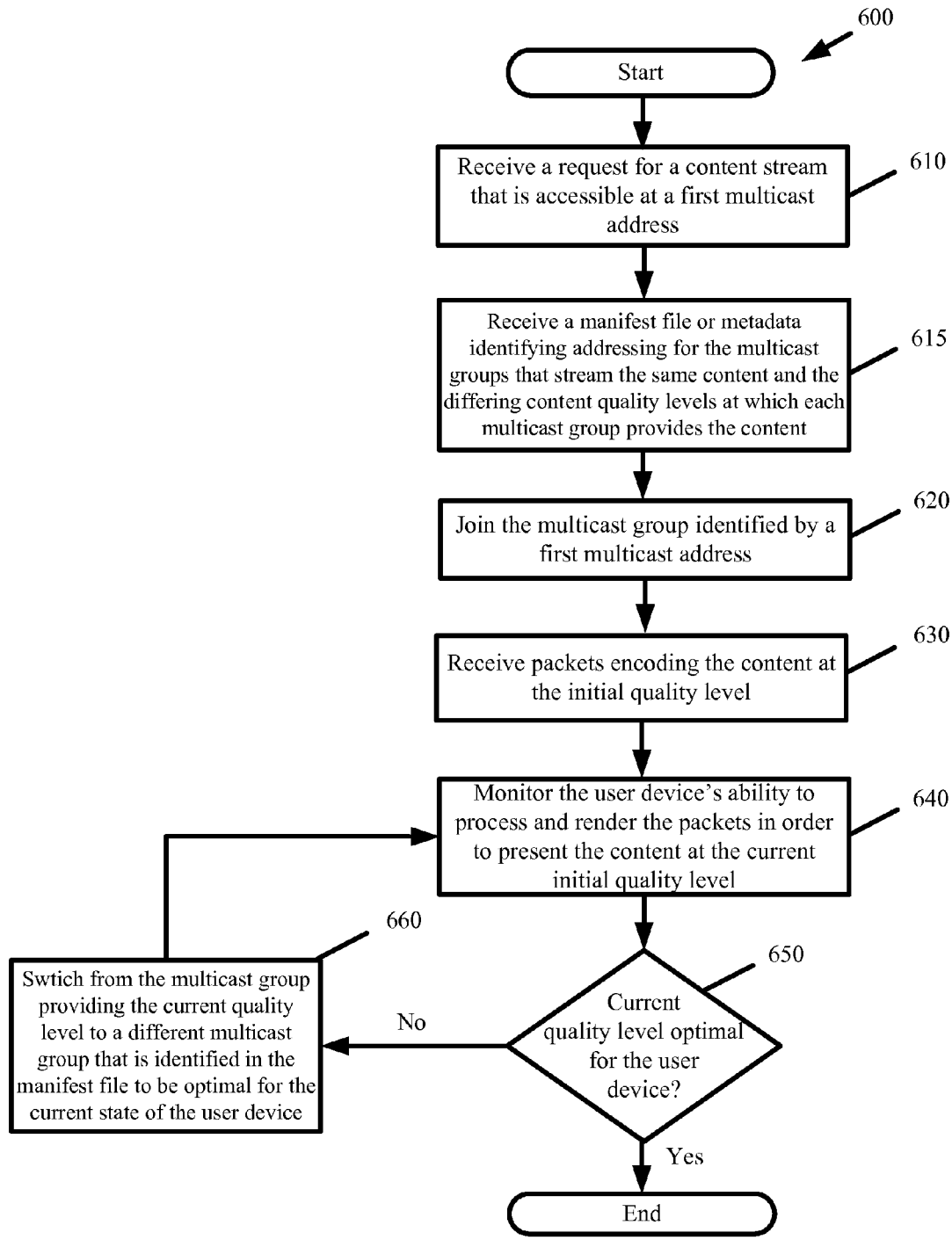
FIG. 6 presents a process performed by the intelligent client application running on a user device to optimize presentation of an event stream for the user device by dynamically changing quality of the event by switching between different multicast groups in accordance with some embodiments.

FIG. 6 presents a process 600 performed by the intelligent client application running on a user device to optimize presentation of an event stream for the user device by dynamically changing quality of the event by switching between different multicast groups in accordance with some embodiments. The process 600 commences by receiving (at 610) a request for a content stream that is accessible at a first multicast address. The request may originate in response to a user invoking a link, entering an address, or selecting a file, service, or sub-application to load the content stream.

In response to the request, the process obtains (at 615) a manifest file or metadata that identifies addressing for the multicast groups that stream the same content and the differing content quality levels at which each multicast group provides the content. The manifest file or metadata can be obtained prior to the request or in response to the request.

The process joins (at 620) the multicast group identified by a first multicast address. The first multicast address may identify an initial or default quality level for the content. The content quality level can vary based on general classifications such as low definition, standard definition, high definition, and ultra high definition, wherein the initial quality level is one of the general classifications. Alternatively, the content quality level can be quantified in terms of a bit rate encoding for the content (e.g., 3 megabits per second (Mbps), 1 Mbps, etc.), a resolution (e.g., 1920×1080, 4K, etc.), a level of compression (e.g., lossless, minimum lossy compression, maximum lossy compression, etc.), file size, or encoding (e.g., MPEG-2, H.264, H.265, etc.) as some examples.

The process receives (at 630) packets encoding the content at the initial quality level. As part of receiving the packets encoding the content at the initial quality level, the process may also periodically receive metadata. The metadata may serve to update the data in the manifest file or may serve as a substitute for the manifest file if the manifest file is not provided when the streaming is initialized.

Contemporaneous with receipt of the packets encoding the content at the initial quality level, the process monitors (at 640) the user device's capabilities and ability to process and render the packets at the current initial quality level. In some embodiments, the process monitors user device capabilities such as screen resolution, screen size, operating system, battery life, and supported codecs as some examples. In some embodiments, the process monitors the user device's ability to process the content and resource usage based on any of processor speed, processor load, available memory, memory usage, and frame rendering speed of the user device as some example. In some embodiments, the process monitors the network connectivity by measuring network bandwidth, network throughput, network latency, packet loss, amount or time for buffering, and jitter as some examples.

Based on the monitoring and the different available quality levels identified in the manifest file or metadata, the process determines (at 650) if the current initial quality level is optimal for the user device. When the current quality level is optimal, the process ends or can revert to step 640 until the content stream terminates or completes. When the current quality level is sub-optimal, the process switches (at 660) from the multicast group providing the current quality level to a different multicast group that is identified in the manifest file to be optimal for the current state of the user device. For instance, if the initial quality level requires too much bandwidth or too much processing power from the user device, the process will switch from the multicast group providing the initial quality level to a different multicast group providing a lower quality level that is less taxing of the user device and network connection. As another example, if the initial quality level underutilizes the user device resources and provides a poor end user experience as a result, the process will switch from the multicast group providing the initial quality level to a different multicast group providing a higher quality level. The switch is made by changing from the first multicast address to a different second multicast address identifying the optimal multicast group. Specifically, the intelligent client application leaves the multicast group providing the initial quality level and joins the multicast group providing the optimal quality level. The process then continues monitoring (at 640) performance of the user device in order to further optimize the quality of the event stream for the user device based on changing loads on the user device or network connectivity. The process continues until the content stream is terminated or completed.

In this manner, the content source can stream content at different quality levels to thousands of user devices and only incur the burden associated with streaming a different multicast group for each supported quality level. The burden on the content source would be significantly greater when providing the different quality levels to thousands of users through unicast as unicast streaming would require the content source to establish a separate connection and provide a separate stream to each of the user devices. For example, the content source can create ten multicast groups and stream ten different quality level encodings for event content over the ten multicast groups to thousands of user devices with the content source incurring only the overhead for the ten streams. Conversely, streaming the same event content with the same quality level encodings with unicast would impose additional linear overhead for each user device receiving the event content.

Some embodiments also support streaming content at different quality levels using a combination of different multicast groups and unicast, with unicast being used to support additional quality levels not available through the different multicast groups. In some such embodiments, the multicast groups support the common quality levels at which content is consumed. For example, a first multicast group may optimize content for viewing on a Microsoft Windows user device, a second multicast group may optimize content for viewing on an iOS user device, a third multicast group may optimize content for viewing on an Android user device, and unicast is used to provide customized optimization for other user devices. In this hybrid solution, multicast is used to provide different quality levels to the majority of user devices with unicast being used to support a minority of user devices. The manifest file or metadata identifies the quality level encodings for the intelligent client application allowing the application to select the quality level encoding that is best for the user or user device on which the application executes.

Figure 7:
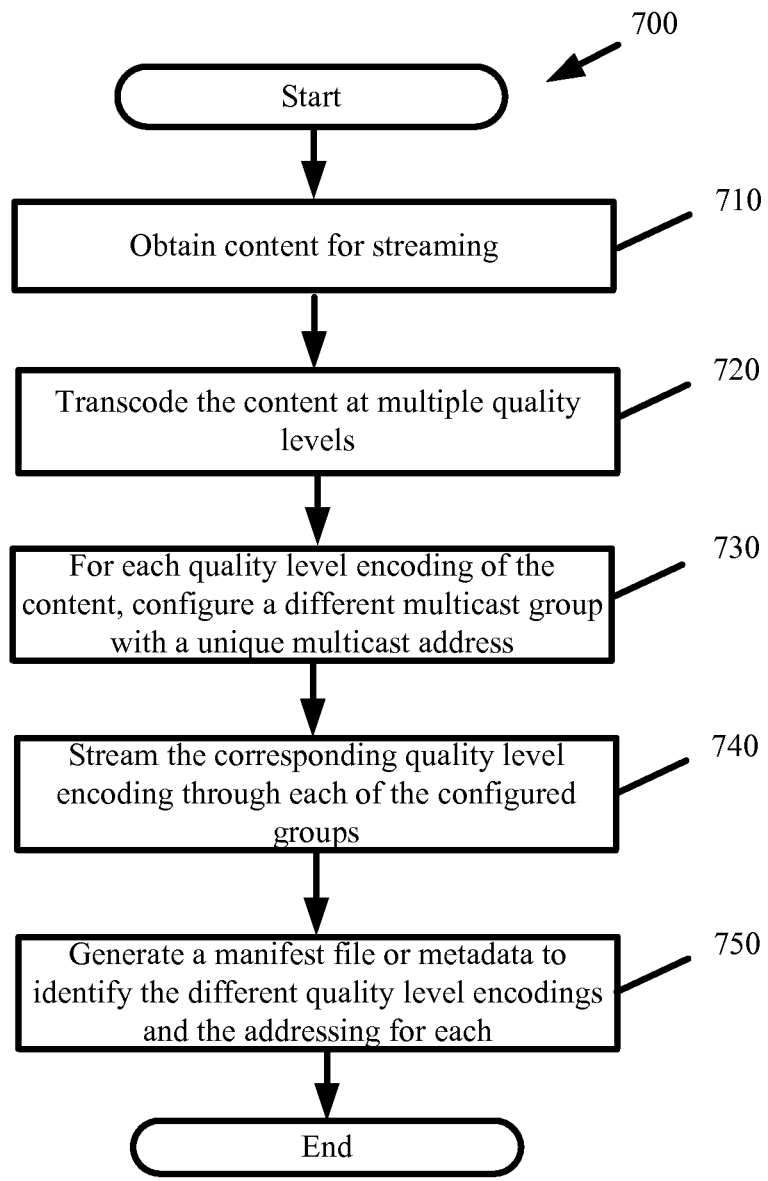
FIG. 7 presents a process performed by a content source to stream an event at different quality levels over multicast.

FIG. 7 presents a process 700 performed by a content source to stream an event at different quality levels over multicast. The process 700 commences when the content source obtains (at 710) content for streaming. The process transcodes (at 720) the content at multiple quality levels. The transcoding creates the different quality level encodings for the event content. The process then assigns each quality level encoding to a different multicast group. Specifically, for each quality level encoding of the even content, the process configures (at 730) a different multicast group with a unique multicast address, wherein the unique multicast address for each group can be a unique IP address or the same IP address with a unique port number. The process then streams (at 740) the corresponding quality level encoding through each of the configured groups. In some embodiments, prior to streaming the different quality level encodings, the process may perform a multicast advertisement routine to notify downstream routers of the new groups that are available. The process also generates (at 750) a manifest file or metadata to periodically include within the streams to notify the intelligent client application running on the user devices of the different quality level encodings that are available and the addressing for each.

IV. Customized Advertisement Delivery Via Multicast

Some embodiments of the multi-tenant over-the-top multicast solution leverage the different multicast groups to deliver customized or targeted secondary content to different users receiving the same primary content stream. In some such embodiments, the primary content stream is a streaming event and the secondary content is advertising, informational, or other content that is presented during breaks throughout the primary content stream, overlaid onto the primary content stream, or otherwise presented with the primary content stream. The secondary content can itself be a stream. Different multicast groups are configured to provide different secondary content to different user devices based on any of several factors including, for example, geographic region, user interests, user demographic information (e.g., age, sex, income level), user browsing behavior, and user device type. Monitoring performed by the intelligent client application is used to select the secondary content that is most relevant to the user or user device on which the intelligent client application executes. For example, a sporting event is streamed using a first multicast group. During a break or pause in the sporting event, the intelligent client application switches from the first multicast group to one of several other multicast groups that provides an advertisement or other embedded content that is relevant to the user device on which the intelligent client application runs. The application switches back to the first multicast group when the sporting event resumes and the presentation of the advertisement or other embedded content is complete.

Figure 8:
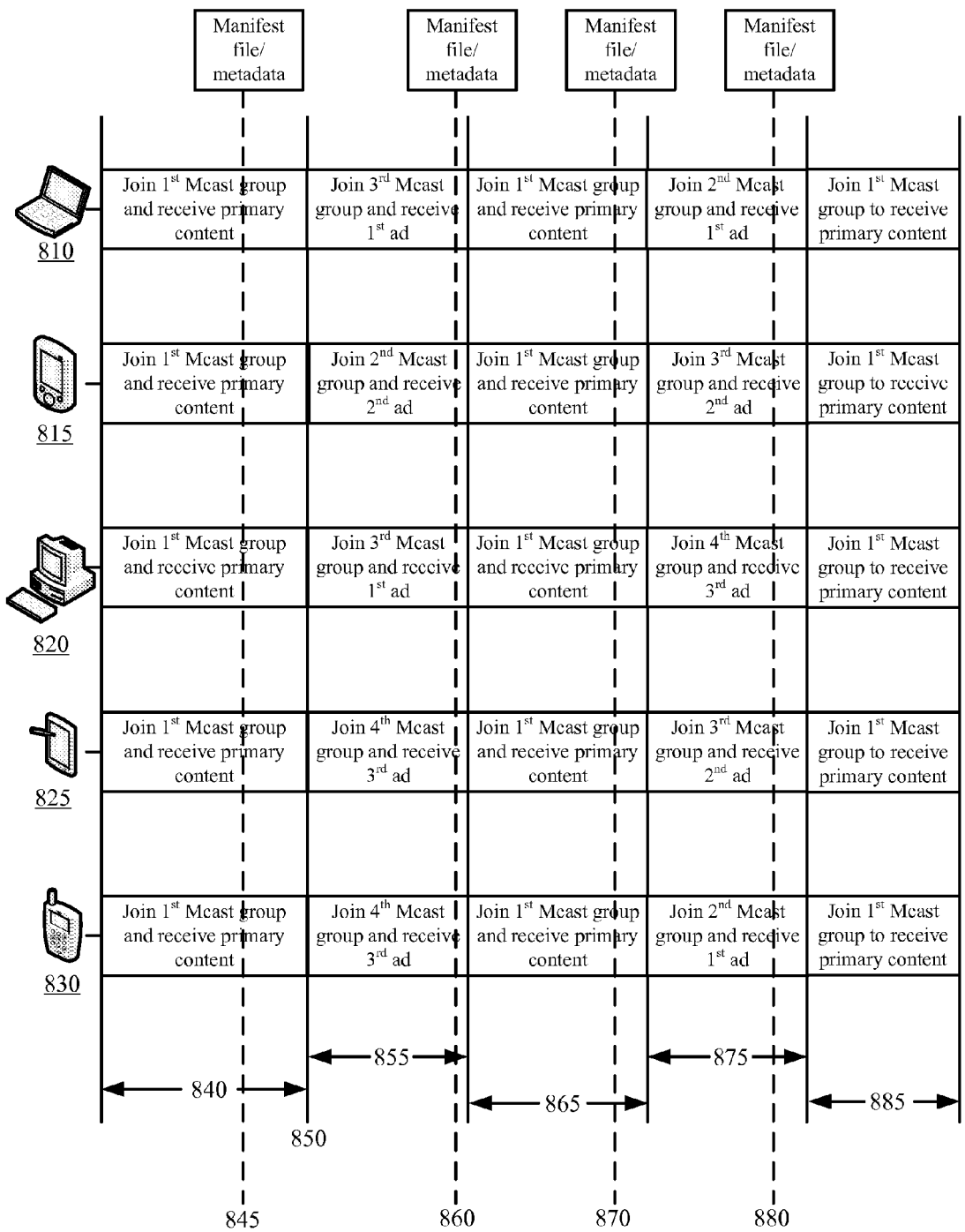
FIG. 8 presents different timelines conceptually illustrating the use of multicast to deliver customized or targeted secondary content to different user devices in accordance with some embodiments.

FIG. 8 presents different timelines conceptually illustrating the use of multicast to deliver customized or targeted secondary content to different user devices in accordance with some embodiments. Each timeline illustrates operation of an intelligent client application running on a different user device 810, 815, 820, 825, and 830 over a period of time. Specifically, each timeline identifies a multicast group that an intelligent client application joins and corresponding content that it receives over the period of time.

Over interval 840, all user devices 810-830 receive the same primary content as a result of the intelligent client application running on each device joining a first multicast group. The primary content can be a movie, sporting event, television program, or other streaming event.

At time 845 within interval 840, a manifest file or metadata is passed to each of the user devices 810-830 receiving the primary content through the first multicast group. The manifest file or metadata identifies an upcoming break in the primary content at time 850 for an interval 855, wherein interval 855 is to be used to present different targeted secondary content to the user devices 810-830. In some embodiments, the time of the break is not identified in the manifest file or metadata. Instead, the break is identified by a blackout period or period of no content or empty packets in the primary content stream. The manifest file or metadata does however identify addressing for second, third, and fourth multicast groups that provide different secondary content, such as advertisements, during interval 855 and parameters qualifying the secondary content. The parameters can include geographic qualifiers that identify which secondary content from the second, third, and fourth multicast groups is relevant for user devices operating in different geographic regions. This facilitates regional advertising, whereby users in Los Angeles receiving the primary content stream, receive different secondary content than users in New York receiving the primary content stream. The parameters can alternatively or additionally include age qualifiers that identify which secondary content from the second, third, and fourth multicast groups is relevant for users of different age groups (e.g., children, adult, and elderly). It should be apparent that the parameters can include many other qualifiers including sex, race, income level, browsing history, and user device as some examples, in combination with or independent of the geographic and age qualifiers described above.

The intelligent client application running on the user device is tasked with obtaining the relevant qualifying parameters about the user device or user of that user device in order to determine, based on the parameters specified in the manifest file or metadata, which secondary content from the second, third, and fourth multicast groups is most relevant. The intelligent client application can obtain this information from registration information that the user provides when first initializing the application, from user agent parameters or other system identifiers identifying the user device, from a user profile, or from information that the application compiles as a result of monitoring user behavior and usage of the corresponding user device.

As shown in FIG. 8, at time 850, the intelligent client applications running on the first and third user devices 810 and 820 switch from the first multicast group to the third multicast group to present a first advertisement that is streamed over the third multicast group during interval 855, the intelligent client application running on the second user device 815 switches from the first multicast group to the second multicast group to present a second advertisement that is streamed over the second multicast group during interval 855, and the intelligent client applications running on the fourth and fifth user devices 825 and 830 switch from the first multicast group to the fourth multicast group to present a third advertisement that is streamed over the fourth multicast group during interval 855. The advertisements presented through the second, third, and fourth multicast groups can be originated by the same content source that originates the primary content of the first multicast group. Alternatively, the advertisements presented through the second, third, and fourth multicast groups can be originated by different advertisement servers that operate in concert but independent of the content source that originates the primary content stream using the first multicast group.

At time 860 within interval 855, each of the second, third, and fourth multicast groups delivers a manifest file or metadata to revert the user devices 810-830 back to the first multicast group for resumption of the primary content stream at the end of interval 855. Specifically, the configuration information from this manifest file or metadata may identify a time to perform the multicast group switch and an address of the first multicast address to switch to at the designated time. As before, the time when the switch is to be performed can be omitted from the configuration information and can occur when there is a blackout period in the corresponding multicast group.

At the end of interface 855, each of the user devices 810-830 switch back to the first multicast group and receive the second segment of the primary content stream during interval 865. Another manifest file or metadata is delivered at time 870 during interval 865 through the first multicast group. This manifest file or metadata identifies a new set of parameters qualifying users for advertisements to be presented during interval 875 at the conclusion of interval 865.

Consequently, at the end of interval 865, the first and fifth user devices 810 and 830 switch to the second multicast group for receipt of a first advertisement during interval 875, the second and fourth user devices 815 and 825 switch to the third multicast group for receipt of a second advertisement during interval 875, and the third user device 830 switches to the fourth multicast group for receipt of a third advertisement during interval 875. A manifest file or metadata is also passed at time 880 during interval 875 over the second, third, and fourth multicast groups to revert the intelligent client applications and user devices 810-830 back to the first multicast group to resume receipt of the last segment of the primary content stream during interval 885.

FIG. 8 is described with multiple manifest files or metadata being passed at different intervals over the timeline. In some embodiments, a single manifest file provided upon initializing the primary content stream is used control the intelligent client application operation throughout the duration of the primary content stream by indicating when the breaks in the programming occur, the different secondary content multicast groups available for each break, and any qualifying parameters for the secondary content at each break. In other words, with one manifest file, the primary content originator can control which multicast group is selected during interval 855 for presentation of a custom advertisement during the first break and which multicast group is selected during interval 875 for presentation of a custom advertisement during the second break, and to revert the client application back to the first multicast group after presentation of each custom advertisement is complete. In some embodiments, the operation of the intelligent client application in switching between primary content and different available secondary content is controlled by metadata. The metadata can arrive some time prior to a transition taking place. As packet loss may occur during transmission, the metadata can be sent multiple times prior to the transition taking place.

Figure 9:
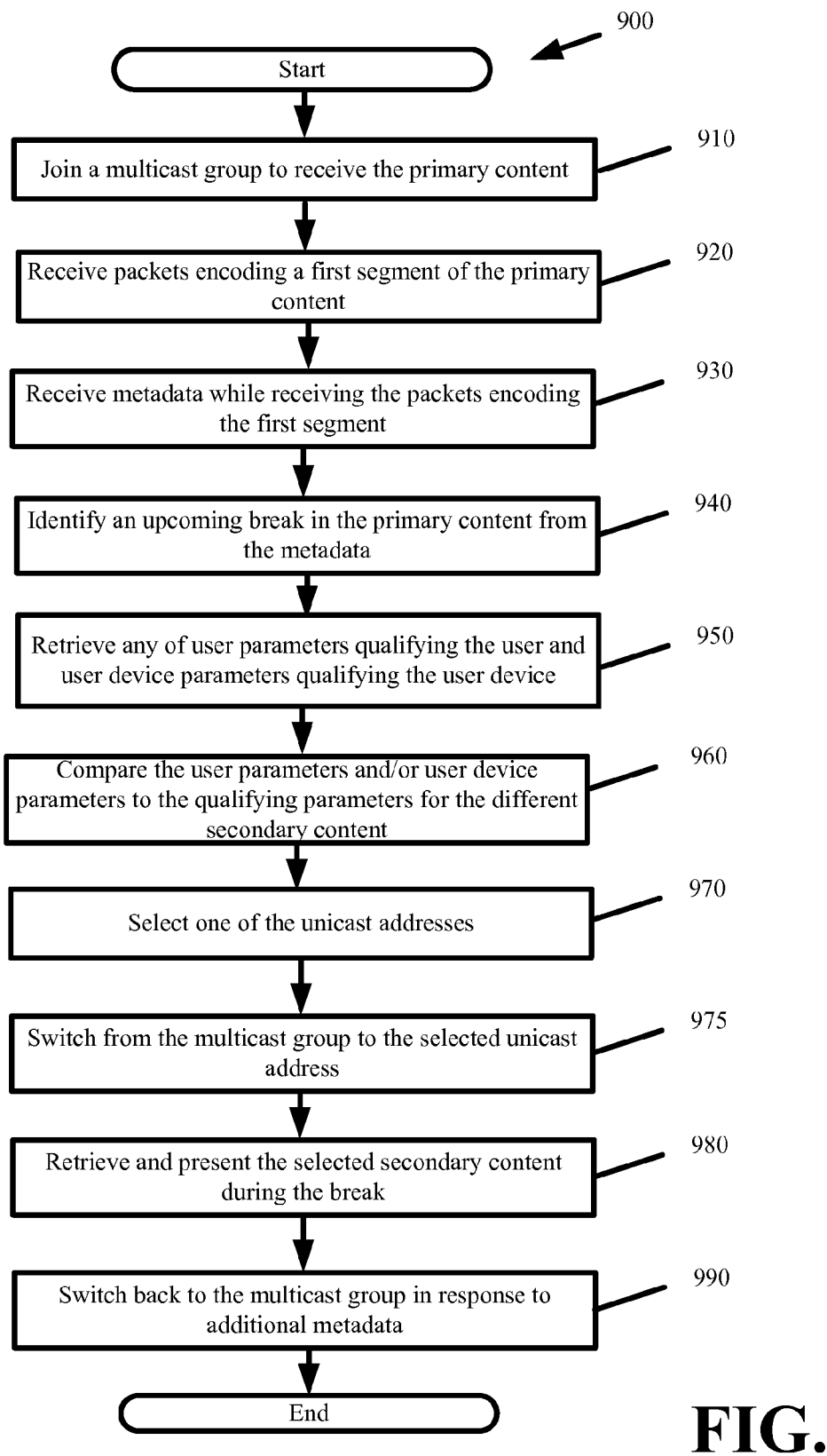
FIG. 9 provides a process implementing a hybrid solution whereby primary content is delivered using multicast and secondary content is delivered using unicast.

In some embodiments, the solution can be tuned to provide the primary content stream via multicast while identifying a mix of multicast and unicast for delivery of the targeted secondary content. This solution may be preferred to increase the different secondary content choices. FIG. 9 provides 900 a process implementing a hybrid solution whereby primary content is delivered using multicast and secondary content is delivered using unicast. The process 900 is performed by the intelligent client application running on a user device.

The process commences when the user device joins (at 910) a multicast group to receive the primary content stream. The process then begins to receive (at 920) packets encoding a first segment of the primary content which are rendered to present the primary content on the user device. The process also receives (at 930) metadata while receiving the packets encoding the first segment.

From the metadata, the process identifies (at 940) an upcoming break in the primary content, different qualifying parameters for different secondary content available during the break, and different unicast addresses for accessing the different secondary content. The upcoming break may be identified with a specific time or by a certain amount of black space occurring during presentation of the primary content stream.

The process retrieves (at 950) any of user parameters qualifying the user and user device parameters qualifying the user device. The intelligent client application may continually monitor and update the user parameters and user device parameters or may retrieve these parameters from a database.

Next, the process compares (at 960) the user parameters and/or user device parameters to the qualifying parameters for the different secondary content. Based on the comparison, the process selects (at 970) one of the unicast addresses and switches (at 975) from the multicast group to the selected unicast address. The process then retrieves (at 980) and presents the selected secondary content during the break before receiving additional metadata that causes (at 990) the process to switch back to the multicast group.

In some embodiments, one unicast address can be used to provide the targeted secondary content. In some such embodiments, when it is time for the intelligent client application to present the secondary content, the application transitions to a unicast address and submits the user parameters and/or user device parameters to the host machine at the unicast address. The host machine then provides secondary content that is relevant to at least one of the user and user device in response.

V. Customized Time Shifting with Multicast

Figure 10:
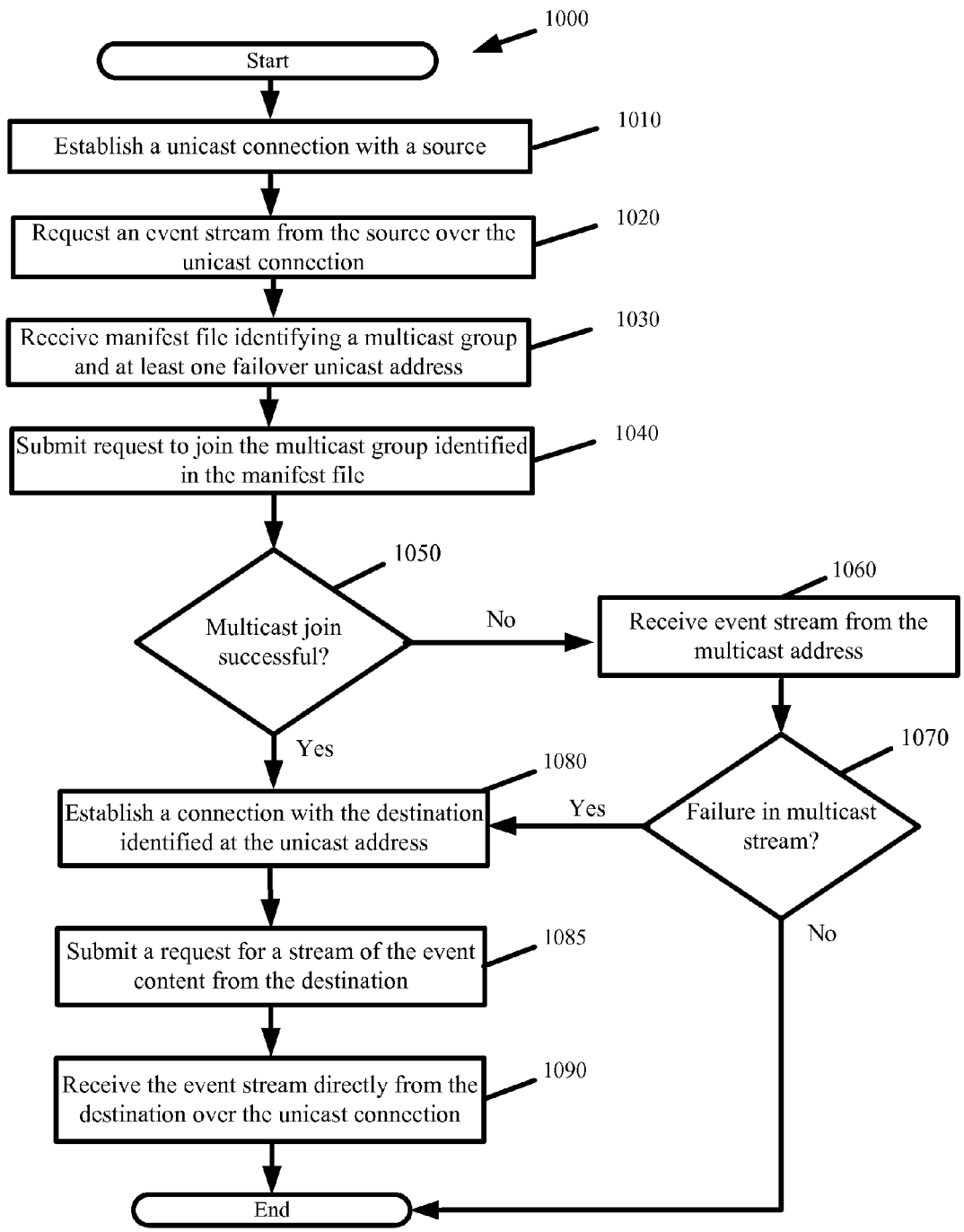
FIG. 10 presents a process describing the hybrid multicast and unicast failover implementation.

Since all networks do not support multicast content streaming or do not have the necessary configuration to support the multicast groups created for the multi-tenant over-the-top multicast solution, some embodiments provide a hybrid multicast and unicast implementation that allows for users that cannot receive multicast streamed content to failover to a unicast stream. FIG. 10 presents a process 1000 describing the hybrid multicast and unicast failover implementation.

The process 1000 commences with a user device establishing (at 1010) a unicast connection with a source and requesting (at 1020) an event stream from the source over the unicast connection. In response to the request, the process receives (at 1030) a manifest file identifying at least multicast group at which the event stream is available and at least one unicast address to which the user device can failover should the multicast stream be unavailable to the user device.

The process submits (at 1040) a request to join the multicast group identified in the manifest file in order to receive a default multicast stream of the event content. The process then determines (at 1050) if the join was successful. If user device successfully joins the multicast group it will begin receiving (at 1060) packets from the multicast address identifying the multicast group. If any failure occurs (at 1070) during the stream, the process can perform the failover at step 1080.

If the user device cannot successfully join the multicast group, the user device will not receive any packets and the process fails over to the unicast address identified in the manifest file. The failover occurs by establishing (at 1080) a connection with the destination identified at the unicast address and submitting (at 1085) a request for a stream of the event content from the destination. In response, the process will begin receiving (at 1090) the event stream directly from the destination over the unicast connection. The destination may be the content source or another machine hosting and serving the content source event content.

The failover implementation allows the multicast solutions to be used even when some users rely on unicast to receive various content streams. Nevertheless, the content source still benefits from being able to offload some users to multicast.

The failover scenario may arise when the content source distributes a multicast configuration specifying the different multicast groups that it has created and will stream. The content source may not have partnerships with various networks and those networks may not receive or accept the configuration. Other networks may simply not support multicast routing. In preferred embodiments, networks will reserve several multicast addresses to support multicast streaming. As part of the reservation, the networks automatically accept and route packets sent to those multicast addresses from a content source, such that the various multi-tenant over-the-top multicast solutions implemented by the content source are supported without any additional network configuration.

VI. Computer System

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 11:
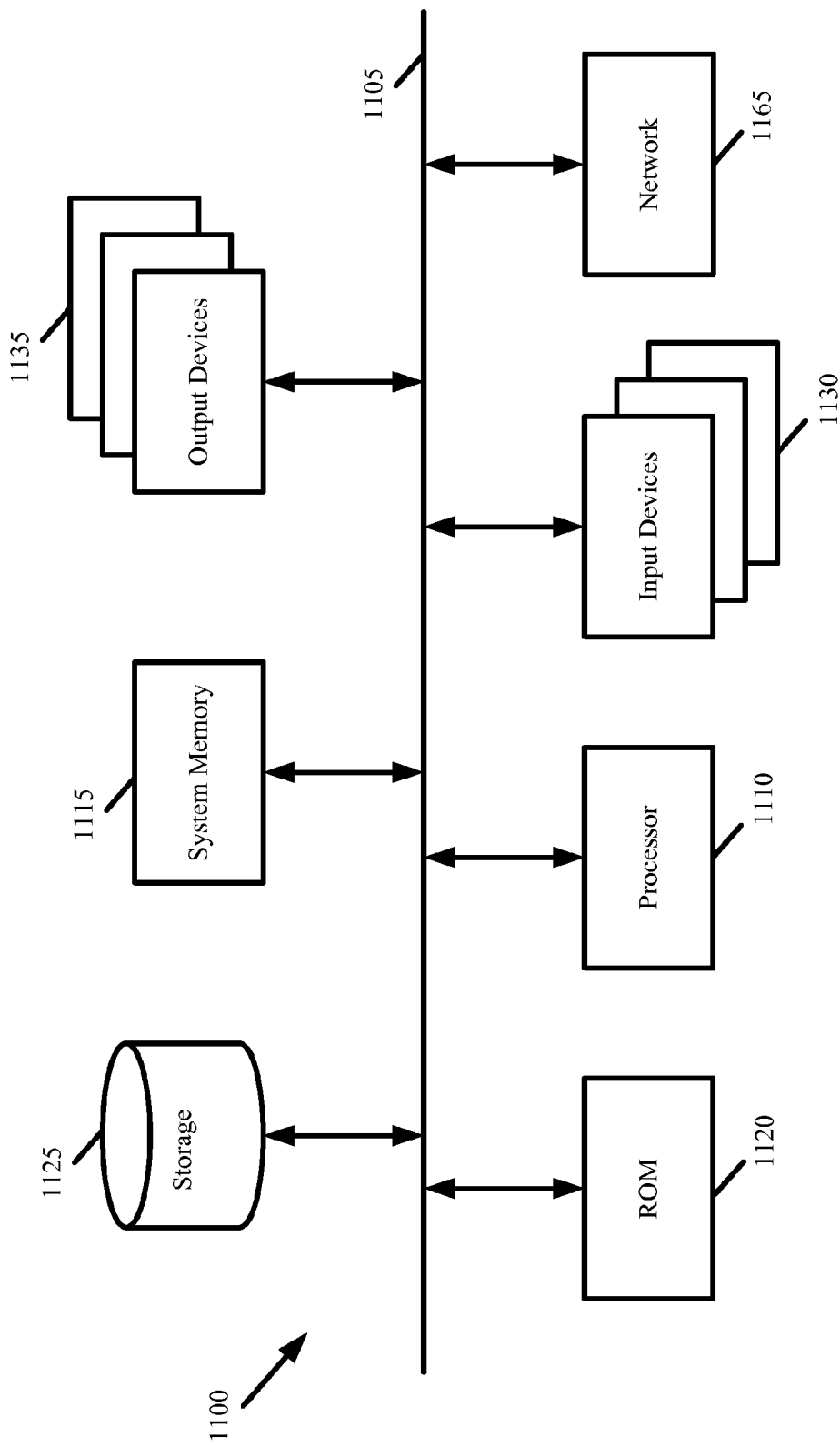
FIG. 11 illustrates a computer system or server with which some embodiments are implemented.

FIG. 11 illustrates a computer system or server with which some embodiments are implemented. Such a computer system includes various types of computer-readable mediums and interfaces for various other types of computer-readable mediums that implement the various methods and machines described above (e.g., caching servers, replay servers, test servers, etc.). Computer system 1100 includes a bus 1105, a processor 1110, a system memory 1115, a read-only memory 1120, a permanent storage device 1125, input devices 1130, and output devices 1135.

The bus 1105 collectively represents all system, peripheral, and chipset buses that communicatively connect the numerous internal devices of the computer system 1100. For instance, the bus 1105 communicatively connects the processor 1110 with the read-only memory 1120, the system memory 1115, and the permanent storage device 1125. From these various memory units, the processor 1110 retrieves instructions to execute and data to process in order to execute the processes of the embodiments described above. The processor 1110 is a processing device such as a central processing unit, integrated circuit, graphical processing unit, etc.

The read-only-memory (ROM) 1120 stores static data and instructions that are needed by the processor 1110 and other modules of the computer system. The permanent storage device 1125, on the other hand, is a read-and-write memory device. This device is a non-volatile memory unit that stores instructions and data even when the computer system 1100 is off. Some embodiments use a mass-storage device (such as a magnetic, solid-state disk, or optical disk and its corresponding disk drive) as the permanent storage device 1125.

Other embodiments use a removable storage device (such as a flash drive or solid-state disk) as the permanent storage device. Like the permanent storage device 1125, the system memory 1115 is a read-and-write memory device. However, unlike storage device 1125, the system memory is a volatile read-and-write memory, such as random access memory (RAM). The system memory stores some of the instructions and data that the processor needs at runtime. In some embodiments, the processes are stored in the system memory 1115, the permanent storage device 1125, and/or the read-only memory 1120.

The bus 1105 also connects to the input and output devices 1130 and 1135. The input devices enable the user to communicate information and select commands to the computer system. The input devices 1130 include alphanumeric keypads (including physical keyboards and touchscreen keyboards), pointing devices (also called "cursor control devices"). The input devices 1130 also include audio input devices (e.g., microphones, MIDI musical instruments, etc.). The output devices 1135 display images generated by the computer system. The output devices include printers and display devices, such as liquid crystal displays (LCD).

Finally, as shown in FIG. 11, bus 1105 also couples computer 1100 to a network 1165 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1100 may include one or more of a variety of different computer-readable media. Some examples of such computer-readable media include RAM, ROM, compact discs (CD-ROM), digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system comprising:
an event source comprising a processor and network connectivity operating to (i) send to a plurality of user devices requesting a particular event, a manifest comprising a plurality of multicast addresses and a different time delay of the particular event associated with each address of the plurality of multicast addresses, and (ii) stream the particular event simultaneously across a plurality of multicast groups, each multicast group of the plurality of multicast groups being identified with a different multicast address of the plurality of multicast addresses from the manifest and each multicast group providing same content of the particular event at different positions in time; and
a client application executing on any of the plurality of user devices having a processor, the client application customizing the particular event presentation by time shifting the particular event during the particular event presentation based on timing and addressing in said manifest, wherein time shifting the particular event comprises (i) presenting a live feed of the particular event by joining a first multicast group of the plurality of multicast groups identified by a first multicast address, (ii) selectively rewinding the particular event presentation in response to a user specified amount of rewinding with the client application leaving the first multicast group and joining a second multicast group of the plurality of multicast groups identified by a second multicast address in response to the user specified amount of rewinding being within a first time interval, and leaving the first multiple group and joining a third multicast group of the plurality of multicast groups identified by a third multicast address in response to the user specified amount of rewinding being within a second time interval that is greater than the first time interval.

2. The system of claim 1, wherein the event source periodically passes the manifest in each of the plurality of multicast groups.

3. The system of claim 2, wherein time shifting the particular event further comprises determining based on said manifest, which of the plurality of multicast groups provides the particular stream at a position near to a user specified amount of rewinding or forwarding.

4. The system of claim 1, wherein the client application initiates receipt of the particular event by submitting a request for the particular event to a unicast address, receiving said manifest in response to said request, and starting playback of the particular event by joining any of the first, second, and third multicast groups according to the manifest.

5. The system of claim 1, wherein the client application switches from presenting the live feed, presenting the particular event delayed by the first time interval, and presenting the particular event delayed by the second time interval in response to user input for rewinding and forwarding the particular event.

6. The system of claim 1, wherein time shifting the particular event further comprises presenting the particular event delayed by a third time interval extending beyond the different positions in time provided by the plurality of multicast groups, wherein said presenting comprises leaving the plurality of multicast groups, connecting directly to the content source using a unicast address, and receiving the particular content delayed by the third time interval directly from the content source using said unicast address.

7. The system of claim 6, wherein the event source further operates to establish a direct connection with the client application over unicast and pass the particular event delayed by the third time interval directly to the client application without replication through any of the plurality of multicast groups.

8. The system of claim 1, wherein each of the first, second, and third multicast addresses is a different Internet Protocol (IP) address.

9. The system of claim 1, wherein the first, second, and third multicast addresses comprise a same IP address and different port numbers for each multicast address.

10. The system of claim 1, wherein the plurality of multicast groups is a first plurality of multicast groups, and wherein the content source further operates to send to the plurality of client applications a manifest comprising the different multicast addresses for the first plurality of multicast groups, different time positions associated with each multicast group of the first plurality of multicast groups, multicast addressing for a second plurality of multicast groups, and parameters qualifying different advertising content presented through each multicast group of the second plurality of multicast groups.

11. The system of claim 10, wherein the client application further customizes the particular event presentation by selecting based on said parameters, a particular advertisement from the different advertising content that is relevant to any of a user or user device on which the client application executes and by presenting the particular advertisement by switching from any of the first plurality of multicast groups to a particular multicast group of the second plurality of multicast groups that presents the particular advertisement.

12. The system of claim 1, wherein the content source further operates to send a manifest comprising the different multicast addresses for the plurality of multicast groups, different time positions associated with each multicast group of the plurality of multicast groups, unicast addressing for retrieving different advertising content, and parameters qualifying the different advertising content, and wherein the client application further customizes the particular event presentation by selecting based on said parameters, a particular advertisement from the different advertising content that is relevant to any of a user or user device on which the client application executes and by presenting the particular advertisement by switching from any of the plurality of multicast groups to a particular unicast address at which the particular advertisement is available.

13. A system comprising:
an event source comprising a processor and network connectivity operating to stream a particular event simultaneously over a plurality of multicast groups and unicast, each multicast group of the plurality of multicast groups being identified with a different multicast address and each multicast group providing same content of the particular event at a different preset quality level, wherein the event source passes at least one of metadata and a manifest file comprising the different multicast addresses at which each of the plurality of multicast groups is accessible, parameters for each preset quality level associated with each multicast group of the plurality of multicast groups, and at least one unicast address associated with a custom quality level of the particular event; and
a client application configured to execute on any of the plurality of user devices having a processor, the client application optimizing the particular event presentation for a particular user device on which the client application executes, wherein optimizing the particular event presentation comprises (i) receiving the particular event at a first quality level by joining a first multicast group of the plurality of multicast groups identified by a first multicast address, (ii) monitoring at the client application, resources and network connectivity of the particular user device while receiving the particular event at the first quality level, (iii) initiating by the client application a change in quality of the particular event presentation based on said monitoring and parameters for each quality level identified in at least one of the metadata and the manifest file, wherein said initiating comprises leaving the first multicast group based on a leave message sent from the client application, joining a second multicast group of the plurality of multicast groups identified by a second multicast address in response to a second quality level of the second multicast group improving the particular event presentation on the particular user device relative to the first quality level of the first multicast group and the client application sending a join message to initiate the joining, and requesting the particular event at a custom third quality level with unicast addressing in response to the custom third quality level being outside the preset quality levels provided by the plurality of multicast groups and the custom third quality level improving the particular event presentation on the particular user device relative to the different preset quality levels provided by the plurality of multicast groups.

14. The system of claim 13, wherein each preset quality level associated with each multicast group of the plurality of multicast groups provides the same content at one of a different resolution and different bit rate.

15. The system of claim 13, wherein each quality level associated with each multicast group of the plurality of multicast groups provides the same content at one of a different level of compression and file size.

16. The system of claim 13, wherein receiving the particular event at the first quality level is in response to user input comprising any of invocation of a link to initiate the particular event and entry of an address to a site providing the particular event.

17. The system of claim 13, wherein the first and second multicast addresses specify the same IP address and a different port number.

18. The system of claim 13, wherein each of the first and second multicast addresses specify a different IP address.

19. A computer-implemented method performed by a user device executing a client application, the client application using a plurality of multicast groups to customize streaming of a particular event to the user device, the computer-implemented method comprising:
submitting a request for the particular event to a unicast address;
receiving at the user device in response to said request, a file identifying a plurality of multicast addresses at which the particular event is available, wherein the plurality of multicast addresses comprises a first set of addresses from which a live feed of the particular event streams at different quality levels and a second set of addresses from which the particular event streams at the different quality levels with a first delay;
joining a first multicast group of the plurality of multicast groups providing a live feed of the particular event at a first quality level, wherein joining the first multicast group comprises accessing the particular event with a first multicast address from the first set of multicast addresses;
customizing presentation of the particular event in response to any of a change in user device resources and network conditions with the user device initiating a leave of said first multicast group and initiating a join of a second multicast group of the plurality of multicast groups identified in said file as providing the live feed of the particular event at a different second quality level, wherein initiating a join of the second multicast group comprises accessing the particular event with a different second multicast address from the first set of multicast addresses; and customizing presentation of the particular event in response to user input to rewind the particular event with the user device initiating a leave of the second multicast group and initiating a join of a third multicast group of the plurality of multicast groups identified in said file as providing the particular event with the first delay, wherein initiating a join of the third multicast group comprises accessing the particular event with a multicast address from the second set of multicast addresses.

20. The computer-implemented method of claim 19 further comprising customizing presentation of the particular event during a break in the particular event stream with the user device leaving any of the first, second, and third multicast groups and joining at least one of a fourth multicast group and a unicast address providing an advertisement that is relevant for any of the user device and a user of the user device.

* * * * *